(12) United States Patent
Hildebrandt

(10) Patent No.: US 7,174,866 B2
(45) Date of Patent: Feb. 13, 2007

(54) DIRECT PRESSURE FEED AIR BLEED SYSTEM

(75) Inventor: Thomas Robert Hildebrandt, Farmington Hills, MI (US)

(73) Assignee: Eaton Corporation, Cleveland, OH (US)

( * ) Notice: Subject to any disclaimer, the term of this patent is extended or adjusted under 35 U.S.C. 154(b) by 22 days.

(21) Appl. No.: 11/082,480

(22) Filed: Mar. 17, 2005

(65) Prior Publication Data

US 2006/0207530 A1    Sep. 21, 2006

(51) Int. Cl.
F01L 9/02 (2006.01)
F16K 31/02 (2006.01)

(52) U.S. Cl. .............................. 123/90.12; 251/129.01
(58) Field of Classification Search ............. 123/90.12; 251/129.01, 129.15
See application file for complete search history.

(56) References Cited

U.S. PATENT DOCUMENTS

| | | | | |
|---|---|---|---|---|
| 6,152,422 A | * | 11/2000 | Staib et al. ............ | 251/129.15 |
| 6,184,766 B1 | * | 2/2001 | Kojima et al. ............... | 335/255 |
| 6,227,154 B1 | * | 5/2001 | Wakeman ................. | 123/90.16 |
| 6,397,891 B1 | * | 6/2002 | Neuhaus et al. ........ | 137/625.65 |
| 6,520,130 B2 | * | 2/2003 | Chiappini et al. ........ | 123/90.12 |
| 6,584,942 B1 | * | 7/2003 | Albertson et al. ........ | 123/90.16 |
| 6,591,796 B1 | * | 7/2003 | Scott ........................ | 123/90.13 |
| 6,666,178 B1 | * | 12/2003 | Keller et al. .............. | 123/90.12 |
| 6,728,626 B2 | * | 4/2004 | Maira et al. ................. | 701/114 |
| 6,732,710 B2 | * | 5/2004 | Borean et al. .............. | 123/432 |
| 6,736,092 B2 | * | 5/2004 | Borean et al. ............ | 123/90.12 |
| 6,758,175 B2 | * | 7/2004 | Dinkel et al. ............. | 123/90.12 |
| 6,782,852 B2 | * | 8/2004 | Van Weelden ............ | 123/90.11 |
| 6,817,325 B2 | * | 11/2004 | Dinkel et al. ............. | 123/90.13 |
| 7,004,123 B2 | * | 2/2006 | de Ojeda .................. | 123/90.12 |
| 7,007,641 B1 | * | 3/2006 | Kryglowski et al. ...... | 123/90.11 |
| 7,021,256 B2 | * | 4/2006 | Wagner et al. ............ | 123/90.11 |
| 2004/0079307 A1 | * | 4/2004 | Dinkel et al. ............. | 123/90.12 |

* cited by examiner

*Primary Examiner*—Hai Huynh
(74) *Attorney, Agent, or Firm*—Anna M. Shih

(57) ABSTRACT

A manifold assembly includes a pressure feed orifice that directly connects an inlet circuit to a control circuit of the manifold. This direct connection between the pressure inlet to the control circuit allows air to be bled out of the manifold assembly. Low pressure fluid in the assembly pushes out air through the orifice out of the assembly, ensuring prompt solenoid response during manifold assembly operation.

12 Claims, 5 Drawing Sheets

DIRECT PRESSURE FEED AIR BLEED SYSTEM

TECHNICAL FIELD

The present invention relates to manifold assemblies that control fluid circulation in an automobile engine, and more particularly to a hydraulic circuit configuration for bleeding air out of a lifter oil manifold assembly.

BACKGROUND OF THE INVENTION

Lifter oil manifold assemblies (LOMAs) are hydraulic circuits generally known in the art and used in conjunction with Displacement on Demand (DoD) engines. The hydraulic circuit routes fluid pressure to solenoid control valves. When commanded by a powertrain control computer, the solenoids direct fluid to valve lifters equipped with a switching mechanism. The solenoids themselves are used as electromechanical devices or hydraulic switches to control fluid supplied to a control circuit when a particular solenoid is energized. The control circuit activates or deactivates a given valve lifter switch by controlling a control pressure applied to the switch; if the control pressure is high, for example, the valve lifter switch is turned on to operate the valve lifter.

When the automobile engine is turned off, air is often introduced into the hydraulic circuit as fluid from the control circuit drains back into the oil pan. This air must be bled out of the control circuit before activating any of the solenoids in the circuit to ensure proper, prompt response by the control circuit. If there is air trapped within the control system, it could create an unacceptable delay between the time the solenoid is energized and the time the control pressure changes in response. To avoid this, the air must be bled out within a specified time period to ensure that the control circuit will be ready for operation within a reasonable amount of time after the engine is turned on.

There is a desire for a hydraulic circuit that can bleed air out of the control circuit quickly and efficiently to optimize circuit performance.

SUMMARY OF THE INVENTION

The present invention is directed to a manifold assembly that includes an orifice that connects an inlet circuit directly to a control circuit in the assembly. This direct connection between the inlet circuit and the control circuit via the orifice allows air to be bled out of the manifold assembly quickly. When the vehicle engine is turned on, the orifice allows low pressure fluid in the assembly to push fluid and any trapped air through the orifice and control circuit out of the assembly.

By routing the orifice to form a direct connection between the inlet circuit and the control circuit rather than around a solenoid pocket or other structure in the assembly, air can be pushed quickly out of the assembly, ensuring prompt solenoid response.

DETAILED DESCRIPTION OF THE EMBODIMENTS

Figure 1:
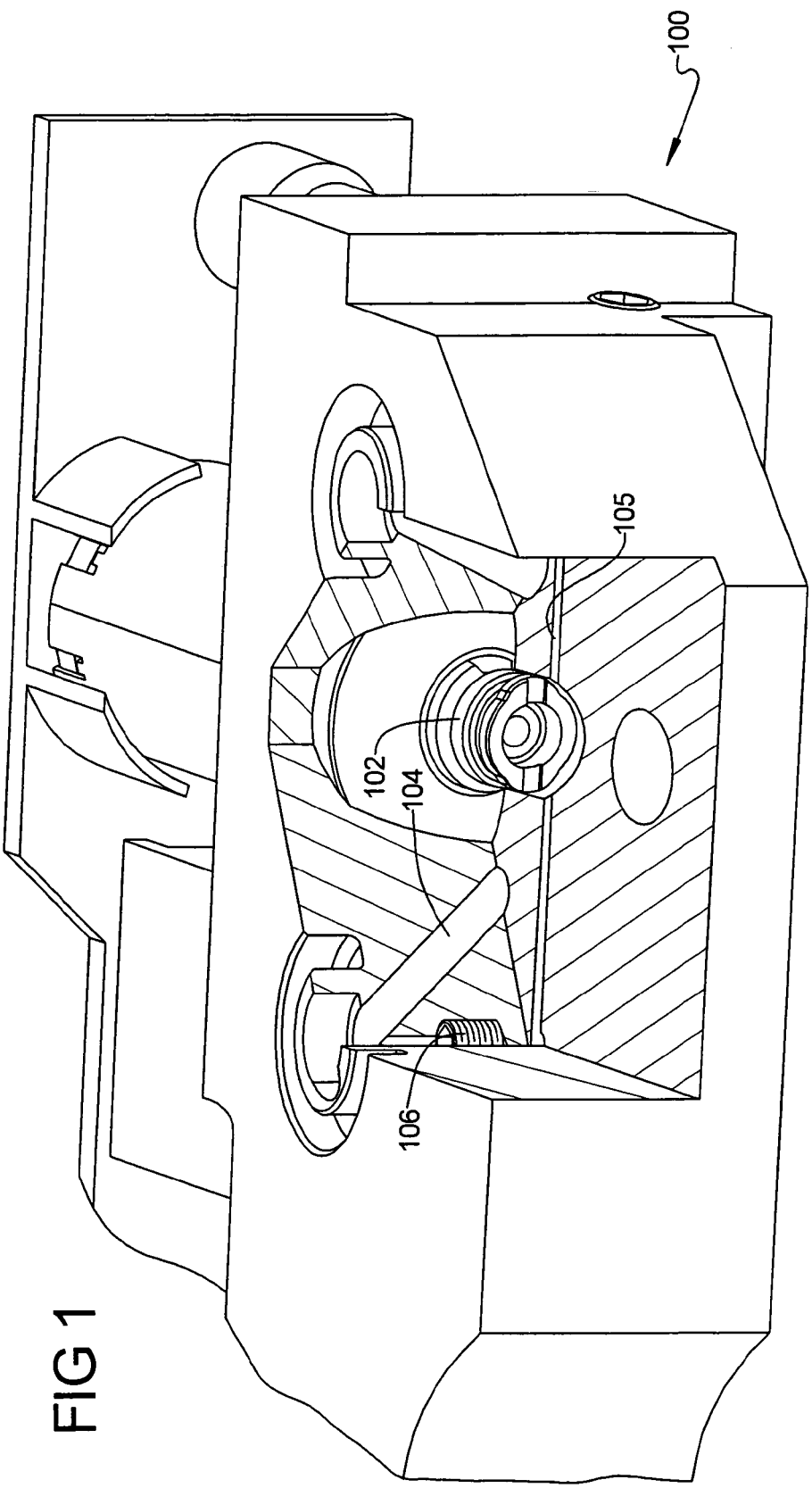
FIG. 1 is a perspective cutaway view of a portion of a manifold assembly according to one embodiment of the invention.
Figure 2:
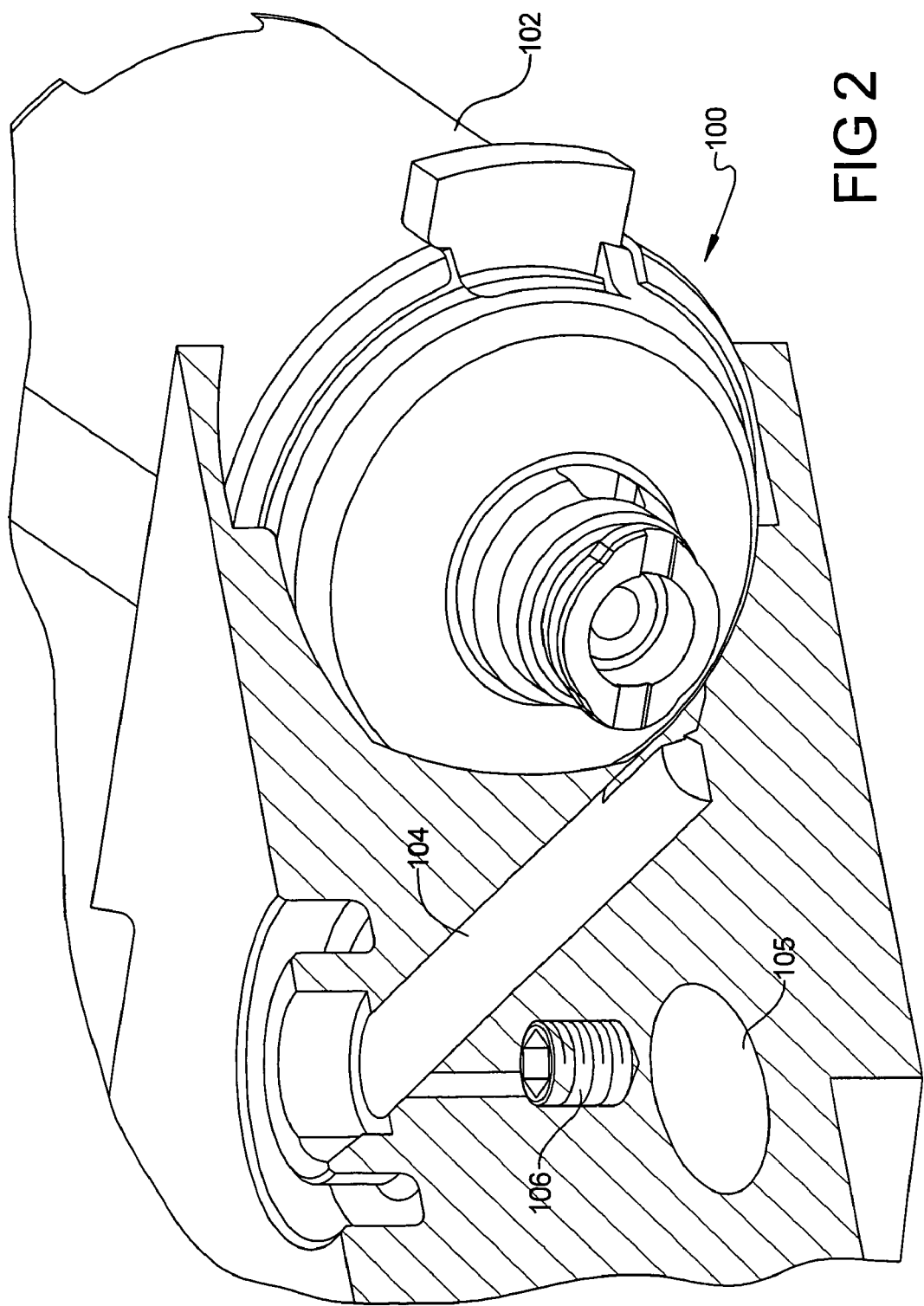
FIG. 2 is another perspective cutaway view of a portion of the inventive manifold assembly.

FIGS. 1 and 2 are cutaway views of a portion of a manifold assembly 100 to be used as a hydraulic circuit for an engine cylinder. The assembly 100 has a solenoid 102 that acts as a hydraulic switch to control fluid pressure through control ports to a lifter mechanical pressure switch (not shown). The assembly 100 includes one or more manifold control channels 104 fluidically coupled to the solenoid 102. Currently known assemblies 100 conned two control channels 104 to each solenoid 102. Fluid, such as oil, is directed into the control channel 104 via a manifold inlet port 105. An orifice 106 is connected between The inlet port 105 and the control channel 104 to provide a path for bleeding air out of the assembly 100. As shown in the figures, the orifice 106 connects the inlet port 105 directly to the control channel 104 rather than routing near the solenoid 102. This direction connection ensure that any air trapped within the orifice 106 or elsewhere in the assembly 100 can quickly leave the assembly 100 within a specified time period to ensure rapid system response.

Figure 3:
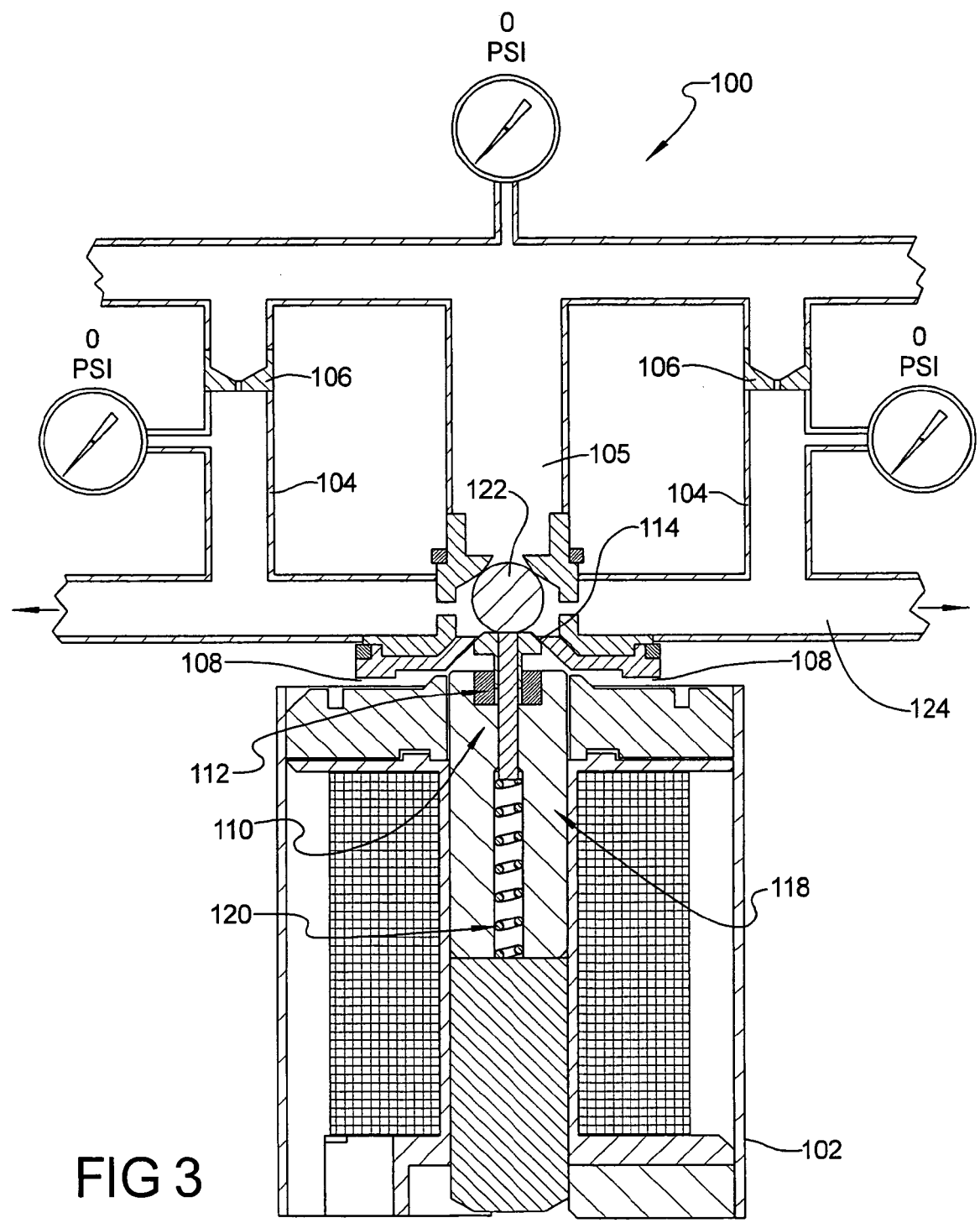
FIG. 3 is a representative diagram of an engine cylinder in the manifold assembly when the engine is turned off.
Figure 4:
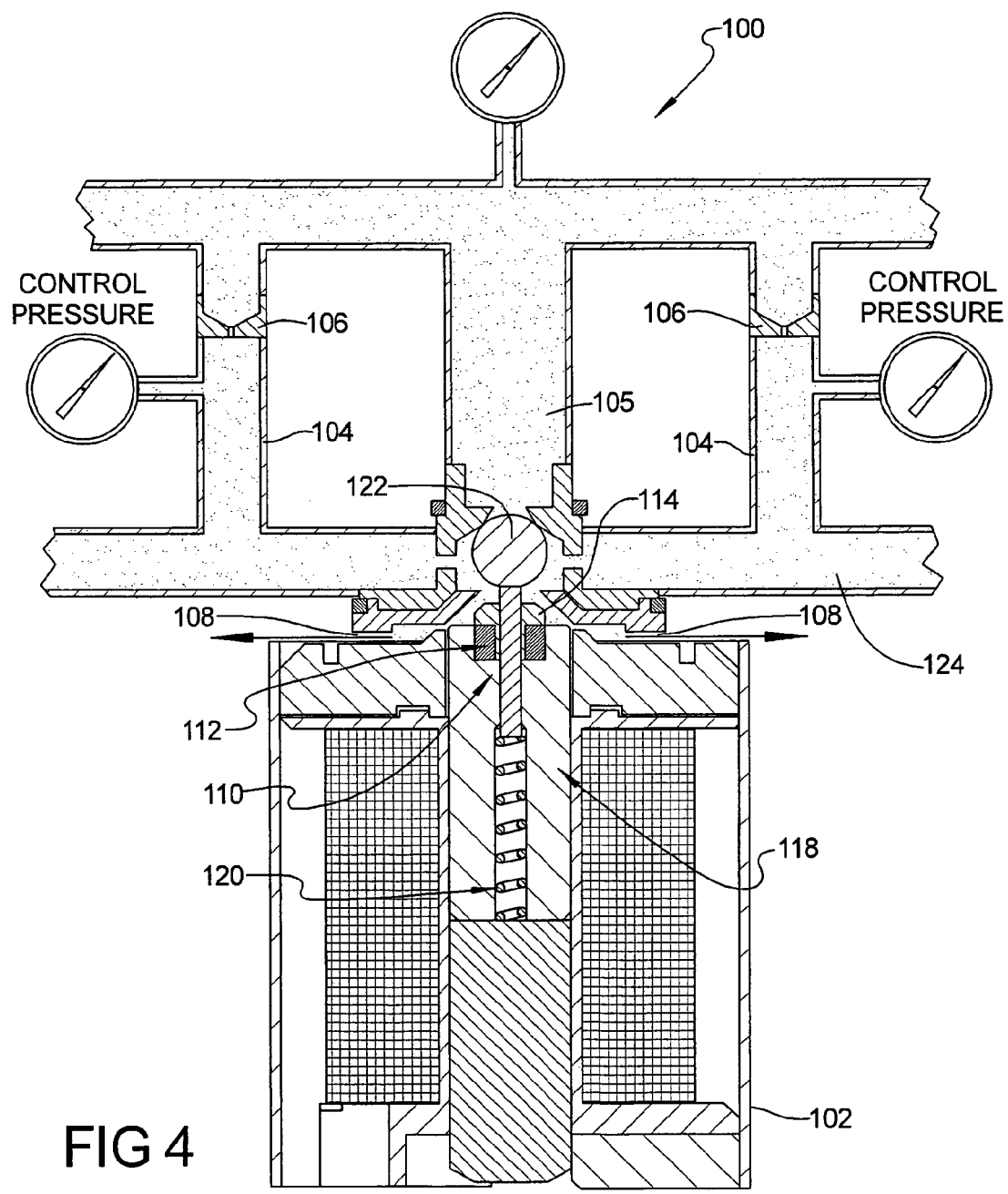
FIG. 4 is a representative diagram of the engine cylinder when the engine is turned on and the solenoid is turned off.
Figure 5:
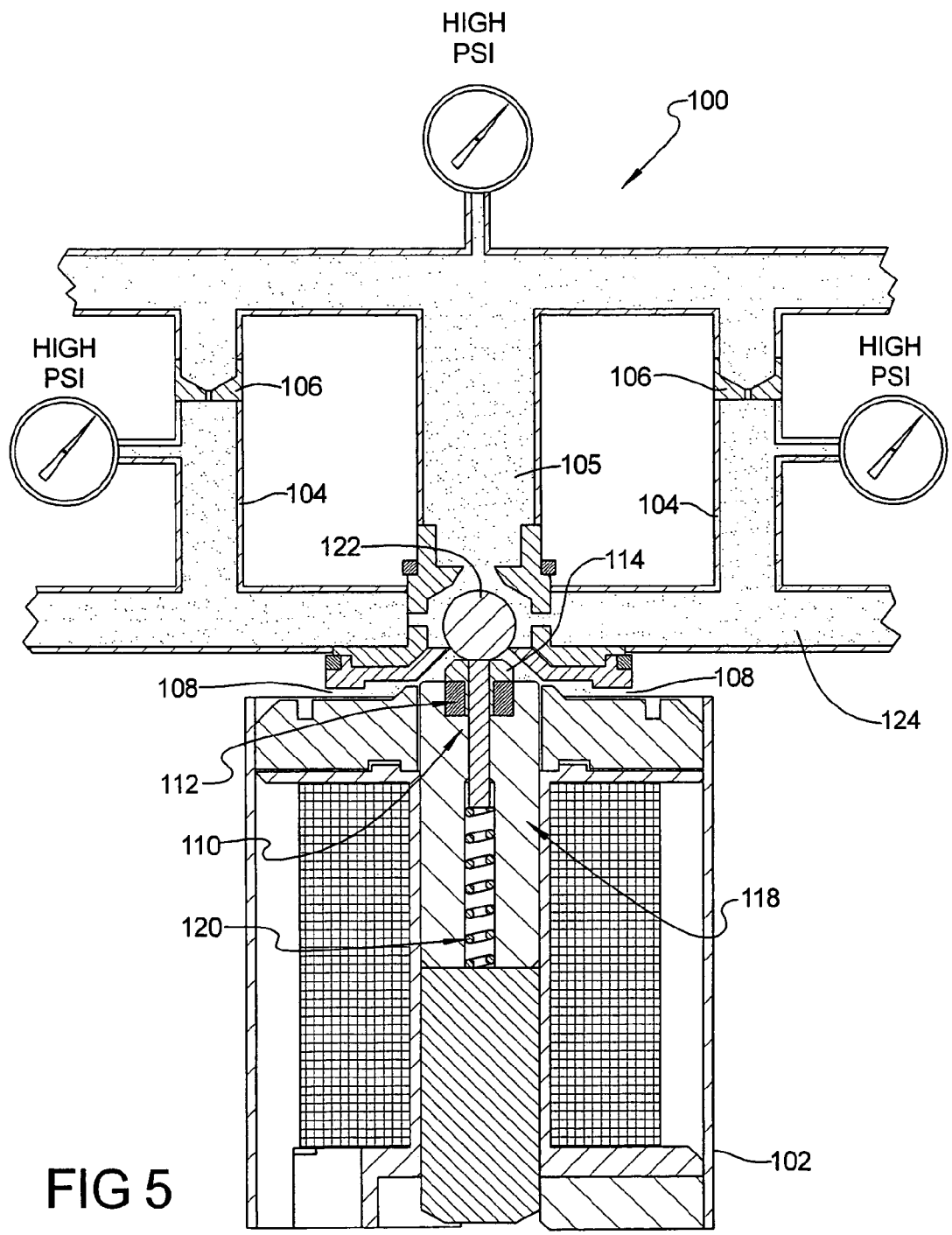
FIG. 5 is a representative diagram of the engine cylinder when the engine is turned on and the solenoid is energized.

Referring to FIGS. 3 through 5, the assembly includes an exhaust port 108 through which air and fluid can flow out of the control channels 104 to a sump (e.g., an oil pan). The assembly 100 includes a relief valve 110, such as a poppet valve, that is associated with the solenoid 102 and that allows air to escape from the assembly 100. The relief valve 110 includes a poppet spring 112 that changes the position of a poppet 114 to open or dose the exhaust port 108. The assembly 100 also includes an armature 118 with an armature spring 120 that is controlled by energization and de-energization of the solenoid 102 to move a ball valve 122 for opening and closing the inlet port 105. The ball therefore controls the pressure of fluid in the control channels 104.

The control channels 104 are fluidically coupled to control ports 124 that communicate with valve lifters (not shown). Thus, operation of the relief valve 110 and the solenoid-controlled ball valve 122 controls the fluid flow and fluid pressure in the control channels 104 and control ports 124, thereby controlling operation of the valve lifters.

FIG. 3 illustrates the assembly 100 when the engine is turned off. At this stage, there is no inlet pressure in the inlet port 105 and no control pressure in the control channels 104. The poppet spring 112 in the relief valve 110 is extended to close the exhaust port 108 from the control port 124. Also, the armature spring 120 is extended to push the ball valve 122 against the inlet port 105. At this point, there is no fluid pressure in the inlet port 105 and control channels 104, and therefore no fluid pressure in the control ports 124.

FIG. 4 illustrates the assembly 100 when the engine is turned on and the solenoid 102 is turned off (i.e., de-energized). At this point, the armature spring 120 continues to push the ball valve 122 against the inlet port 105 to keep it closed, preventing fluid from flowing through the inlet into the control channels 104 as long as the solenoid is de-energized.

The orifice 106 allows the fluid in the control channels 104 to reach a limited, low fluid pressure that is not high enough to activate the valve lifters. However, the orifice 106 is sized to allow the fluid pressure in the orifice 106, and consequently the control channels 104, to reach a level that is high enough to compress the poppet spring 112; the biasing force in the poppet spring 112 is weak enough so that even low fluid pressure in the control channels 104 is enough to open the relief valve 110. As a result, as shown by the arrow A, any air trapped in the control channels 104 flows through the control channels 104, past the open relief valve 110 and out the exhaust ports 108. The orifice 106 size also controls the flow rate of fluid out of the exhaust ports 108. As noted above, arranging the orifice 106 to form a direct fluid path between the inlet port 105 with the control channel 104 ensures that this exhaust flow is quick and reliable.

Once air has been eliminated from the assembly 100, energizing the solenoid 102 will cause the fluid pressure in the control channels 104 to reach full operational pressure quickly and easily, without undesirable delays in system response. More particularly, as shown in FIG. 5, energizing the solenoid 102 causes the armature spring 120 to shift, pulling the ball valve 122 away from the inlet port 105 to allow the fluid to flow into the control channels 104 and equalize the fluid pressure in the control channels 104 and the inlet port 105. At the same time, the ball valve 122 seals the exhaust ports 108, preventing fluid from flowing out into the sump. As a result, the fluid pressure in the control channels 104, and thus the control ports 124, is high enough to activate the valve lifters.

By providing a direct pressure feed orifice from the inlet circuit directly to the control circuit of the manifold assembly, the inventive structure reduces the time needed to bleed any trapped air out of the assembly. It also eliminates the risk of residual air from remaining in the system, which often occurs when the orifice is placed in a solenoid pocket instead of directly connected to the control circuit. This direction connect ensures that the control circuit will reach full system pressure quickly when the solenoid is energized without experiencing unacceptable response delays.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A manifold assembly for controlling a vehicle engine, comprising:
   a solenoid;
   a relief valve and a solenoid-controlled valve associated with the solenoid;
   an inlet circuit having an inlet port associated with the solenoid;
   a control circuit having a control channel associated with the solenoid;
   an exhaust port; and
   an orifice directly fluidically connecting the inlet port with the control channel to form an exhaust path for purging air out of the assembly, wherein the exhaust path passes through the orifice, the control channel, and the exhaust port.

2. The assembly of claim 1, wherein the relief valve in the solenoid is movable between an open position that opens the exhaust port and a closed position that closes the exhaust port.

3. The assembly of claim 2, wherein the relief valve is in the dosed position when the vehicle engine is turned off and the solenoid is de-energized, and wherein the relief valve is in the open position when the vehicle engine is turned on.

4. The assembly of claim 2, wherein the relief valve is resiliently-biased, and wherein the orifice is sized to create a fluid pressure in the control channel sufficient to overcome the bias and open the relief valve.

5. The assembly of claim 1, wherein the solenoid-controlled valve is movable between a closed position that closes the inlet port and opens the exhaust port and an open position that opens the inlet port and closes the exhaust port.

6. The assembly of claim 5, wherein the solenoid-controlled valve is in the closed position when the vehicle engine is turned on and the solenoid is de-energized, and wherein the solenoid-controlled valve is in the open position when the vehicle engine is turned on and the solenoid is energized.

7. A manifold assembly for controlling a vehicle engine, comprising:
   a plurality of solenoids;
   a plurality of relief valves and a plurality of solenoid-controlled valve associated with said plurality of solenoids;
   an inlet circuit having at least one inlet port associated with each of said plurality of solenoids;
   a control circuit having at least one control channel associated with each of said plurality of solenoids;
   a plurality of exhaust ports, wherein each solenoid has at least one exhaust port associated with it; and
   a plurality of orifices, each orifice associated with one of said plurality of solenoids, wherein each orifice directly fluidically connects said at least one inlet part with said at least one control channel to form at least one exhaust path through the orifice, said at least one control channel, and said at least one exhaust port, and wherein fluid pressure in the orifice opens the relief valve to purge air in said at least one control channel through said at least one exhaust port out of the assembly.

8. The assembly of claim 7, wherein:
   when the vehicle engine is turned off, the plurality of relief valves are in a closed position to close said plurality of exhaust ports;
   when the vehicle engine is turned an and at least one of said plurality of solenoids is de-energized, the relief valve in the de-energized solenoid is in an open position to open the associated exhaust port and the solenoid-controlled valve is in the de-energized solenoid is a closed position to close the associated inlet port; and
   when the vehicle engine is turned on and at least one of said plurality of solenoids is energized, the relief valve in the energized solenoid is in an open position and the solenoid-controlled valve is in an open position to open the associated inlet port and close the associated exhaust port.

9. The assembly of claim 7, wherein the relief valve is resiliently-biased toward the closed position, and wherein each of said plurality of orifices is sized to create a fluid pressure in said at least one associated control channel sufficient to overcome the bias and open the relief valve.

10. A method of operating a manifold assembly for controlling a vehicle engine, the assembly having a plurality of solenoids where each solenoid has an associated relief valve and solenoid-controlled valve, an inlet circuit having at least one inlet port associated with each of said plurality of solenoids; a control circuit having at least one control channel associated with each of said plurality of solenoids; a plurality of exhaust ports, wherein each solenoid has at least one exhaust port associated with it; and a plurality of orifices, each orifice associated with one of said plurality of solenoids, wherein each orifice directly fluidically connects said at least one inlet port with said at least one control channel to form at least one exhaust path through the orifice, said at least one control channel, and said at least one exhaust port, the method comprising:

allowing fluid to flow at a first pressure into said at least one control channel when the vehicle engine is turned on, wherein the first pressure Is controlled by at least one of said plurality of orifices; and opening at least one relief valve in response to the first pressure to allow fluid flow through said at least one exhaust path, wherein the fluid flow purges air in the control circuit out of the assembly.

11. The method of claim 10, wherein each relief valve is resiliently biased toward a closed position, and wherein the first pressure Is selected to overcome the bias in at least one relief valve to open said at least one relief valve when the vehicle engine is turned on.

12. The method of claim 11, further comprising the steps of:

when the vehicle engine is turned on and at least one of said plurality of solenoids is de-energized, moving the solenoid-controlled valve of the de-energized solenoid to a closed position to close the associated inlet port; and when the vehicle engine is turned on and at least one of said plurality of solenoids is energized, moving the solenoid-controlled valve of the energized solenoid to an to open the associated inlet port and close the associated exhaust port to allow the fluid to flow at a second pressure higher than the first pressure into the control channel associated with the energized solenoid.

\* \* \* \* \*